United States Patent
Ramos, II (10) Patent No.: US 10,495,282 B2
(45) Date of Patent: Dec. 3, 2019

(54) TAIL LAMP ASSEMBLY WITH OPTIC ILLUMINATION

(71) Applicant: Toyota Motor Engineering & Manufacturing North America, Inc., Erlanger, KY (US)

(72) Inventor: Francisco A. Ramos, II, Ypsilanti, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 91 days.

(21) Appl. No.: 15/581,032

(22) Filed: Apr. 28, 2017

(65) Prior Publication Data
US 2018/0313515 A1    Nov. 1, 2018

(51) Int. Cl.
| | |
|---|---|
| *F21S 43/40* | (2018.01) |
| *F21S 43/20* | (2018.01) |
| *F21S 43/30* | (2018.01) |
| *F21S 43/243* | (2018.01) |
| *F21S 43/19* | (2018.01) |
| *F21S 43/14* | (2018.01) |
| *F21S 43/245* | (2018.01) |

(Continued)

(52) U.S. Cl.
CPC ............. *F21S 43/40* (2018.01); *F21S 43/14* (2018.01); *F21S 43/19* (2018.01); *F21S 43/239* (2018.01); *F21S 43/243* (2018.01); *F21S 43/245* (2018.01); *F21S 43/26* (2018.01); *F21S 43/30* (2018.01); *G02B 6/0055* (2013.01)

(58) Field of Classification Search
CPC .. F21S 43/40; F21S 43/30; F21S 43/26; F21S 43/243; G02B 6/0055; B60Q 1/2696; B60Q 1/30; B60Q 1/0011; B60Q 1/04
See application file for complete search history.

(56) References Cited

U.S. PATENT DOCUMENTS 4,420,797 A * 12/1983 Tohata ................... B60J 5/101
                                                        362/496
5,890,796 A    4/1999 Marinelli et al.
(Continued)

FOREIGN PATENT DOCUMENTS

| CN | 102853357 A | 1/2013 |
|---|---|---|
| DE | 202006011770 U1 | 10/2006 |
| JP | 2015138595 A | 7/2015 |

*Primary Examiner* — Tsion Tumebo
(74) *Attorney, Agent, or Firm* — Dinsmore & Shohl LLP (57) ABSTRACT

A vehicular lamp assembly, a vehicle and a method of providing illumination of a vehicular tail lamp. The assembly includes a combination lamp, lid lamp and one or more optic elements. The combination lamp has a first outer lens and one or more light sources disposed on an inward-facing side of the first outer lens. The lid lamp includes a second outer lens and a reflective element disposed on an inward-facing side of the second outer lens. The optic element is signally cooperative with the light source to convey at least a portion of its direct beam pattern to the reflective element which subsequently redirects a reflected portion into an indirect beam pattern through the lid lamp outer lens. In this way, the light source or sources may be housed solely within a region defined by the combination lamp while giving the appearance of illumination coming from both the combination lamp and the lid lamp.

20 Claims, 5 Drawing Sheets

(51) Int. Cl.
*F21V 8/00* (2006.01)
*F21S 43/239* (2018.01)

(56) References Cited

U.S. PATENT DOCUMENTS

| | | | |
|---|---|---|---|
| 6,192,176 B1* | 2/2001 | Cassarly | B60Q 1/0011 |
| | | | 385/31 |
| 6,280,480 B1 | 8/2001 | Tuttle et al. | |
| 9,103,520 B1 | 8/2015 | Tessnow et al. | |
| 9,849,824 B2* | 12/2017 | Anderson | B60Q 1/0041 |
| 2004/0130904 A1* | 7/2004 | Yamada | B60Q 1/0058 |
| | | | 362/487 |
| 2008/0291685 A1* | 11/2008 | Misawa | B60Q 1/2696 |
| | | | 362/459 |
| 2013/0314935 A1* | 11/2013 | Tokieda | G02B 6/001 |
| | | | 362/511 |
| 2014/0160777 A1* | 6/2014 | Mugge | B60Q 1/0041 |
| | | | 362/508 |
| 2014/0254186 A1* | 9/2014 | Terai | G02B 6/0095 |
| | | | 362/487 |
| 2015/0323149 A1* | 11/2015 | Salter | F21S 43/13 |
| | | | 362/510 |
| 2015/0354774 A1* | 12/2015 | Noritake | B60Q 1/0041 |
| | | | 362/517 |
| 2016/0061397 A1* | 3/2016 | Ito | B60Q 1/0041 |
| | | | 362/520 |
| 2016/0103269 A1 | 4/2016 | Narita | |
| 2016/0207446 A1* | 7/2016 | Kumegawa | B60Q 1/30 |
| 2016/0208995 A1* | 7/2016 | Yoshino | F21S 43/14 |
| 2017/0268741 A1* | 9/2017 | Happy | F21S 43/245 |

\* cited by examiner

TAIL LAMP ASSEMBLY WITH OPTIC ILLUMINATION

TECHNICAL FIELD

The present specification relates generally to improved vehicular lighting assemblies, and more particularly to providing vehicular rear lighting where numerous adjacently-spaced tail lamp assemblies can give the appearance of each having their own light source even though only such source is located within a single lamp.

BACKGROUND

Figure 3:
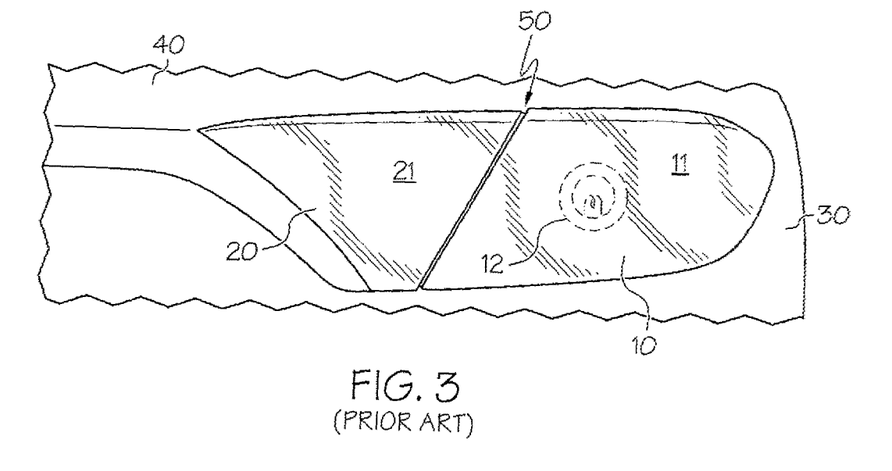
FIG. 3 depicts an elevation view of a vehicular tail lamp assembly according to the prior art.

It is known that vehicular lamp assemblies include a rear combination lamp which is mounted to the back of the vehicle body, as well as a lid lamp which is mounted to the trunk. Both lamps include an outer lens. An example of this is shown in FIG. 3, where a combination lamp assembly 10 is adjacently-spaced relative to a lid lamp assembly 20 such that the former is secured within or otherwise mounted to a quarter panel 30 or related vehicular structure while the latter is secured within or otherwise mounted to a trunk lid 40 or related pivoting or moveable door-like structure. A gap 50 defines a boundary between the stationary quarter panel 30 and the movable trunk lid 40. Both assemblies are covered by a respective lens 11, 21 that has generally transparent optical properties with either red tinted or clear (that is to say, not tinted) portions.

In one form of the known art, a single light source 12 is situated within the combination lamp assembly 10. A disadvantage of such a configuration is that a beam pattern that can be seen from behind a vehicle only emanates from the combination lamp assembly 10, as the lid lamp assembly 20 has no source of light. This in turn limits the amount of surface area on the rear of the vehicle that can provide indicia of braking, turning, reversing or other maneuver and lighting functions.

In another form of the known art, light sources 12 (only one of which is presently shown) may be situated within each of their respective lamp assemblies 10, 20. While a more comprehensive rearward-projecting beam pattern is available, such a configuration necessitates additional complexity in that duplicates of bulbs, housing structure, electric wiring or the like are used. Such complexity adds to overall cost, including the cost associated with installing and maintaining such extra equipment.

The author of the present disclosure has identified a need for a vehicular lamp assembly that provides a high degree of vehicular rearward illumination without the cost or complexity associated with having multiple light sources.

SUMMARY

In one embodiment, a vehicular tail lamp assembly is disclosed. The assembly includes a combination lamp that has a first outer lens and one or more light sources disposed on an inward-facing side of the first outer lens. When illuminated, the light source produces a direct beam pattern at least a portion of which extends substantially rearward of a vehicle through the outer lens. The assembly further includes a lid lamp situated adjacent the combination lamp across a first adjacently-spaced gap between them. The lid lamp includes a second outer lens and a reflective element disposed on an inward-facing side of the second outer lens. The assembly further includes a first optic element signally cooperative with the light source to convey at least a portion of its direct beam pattern to the reflective element which subsequently redirects a reflected portion into an indirect beam pattern through the lid lamp outer lens.

In another embodiment, a motor vehicle includes a platform made up of a wheeled chassis defining a passenger compartment, a fore compartment, an aft compartment, an engine compartment comprising and a guidance apparatus cooperative with the wheeled chassis and the engine in order to provide motive control. The vehicle also includes a head lamp assembly disposed in the fore compartment and a tail lamp assembly disposed in the aft compartment. An engine (such as a conventional internal combustion engine (ICE)) is situated within the engine compartment. The guidance apparatus is coupled to the wheeled chassis and the engine in order to provide motive control of the vehicle. The tail lamp assembly includes a combination lamp, a lid lamp and at least a first optic element in a manner generally similar to that of the previous embodiment.

In yet another embodiment, a method of providing illumination to an aft compartment of a vehicle is disclosed. The method includes configuring a tail lamp assembly to includes a combination lamp, a lid lamp and an optic element. The combination lamp includes a first outer lens and one or more light sources disposed inwardly relative to the first outer lens, while the lid lamp is adjacently-spaced relative to the combination lamp such that a gap is formed between them. The lid lamp includes a second outer lens and a reflective element disposed inwardly of the second outer lens. The optic element is signally cooperative with the light source. The method further includes producing with the light source a direct beam pattern at least a portion of which extends substantially rearward of the aft compartment through the outer lens. The method additionally includes conveying at least a portion of the direct beam pattern to the reflective element through the optic element; and redirecting a reflected portion of the conveyed direct beam portion into an indirect beam pattern through the lid lamp outer lens.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein include increasing the lighting signature of an automotive vehicle such that an additional rearward projection of the beam pattern is achieved without increasing the number of light sources within a tail lamp assembly. In particular, the tail lamp assembly includes an optic element disposed between a quarter panel-mounted combination lamp and a trunk lid-mounted lid lamp to direct light from the light source that is situated behind the outer lens of the rear combination lamp into the lid lamp so as to increase the light signature of the entire tail lamp assembly. While the tail lamp assembly of the present disclosure has a similar outward structural appearance to the device depicted in FIG. 3, its ability to increase the rearward illumination of a light source within the assembly without increasing the number of light sources as a way to increase a vehicular lighting signature is not. Moreover, the ability to extend a single light source across adjacent but unconnected vehicular sections in order to increase such lighting signature at the rear of the vehicle in the manner disclosed herein is something not contemplated in the device of FIG. 3.

Figure 1:
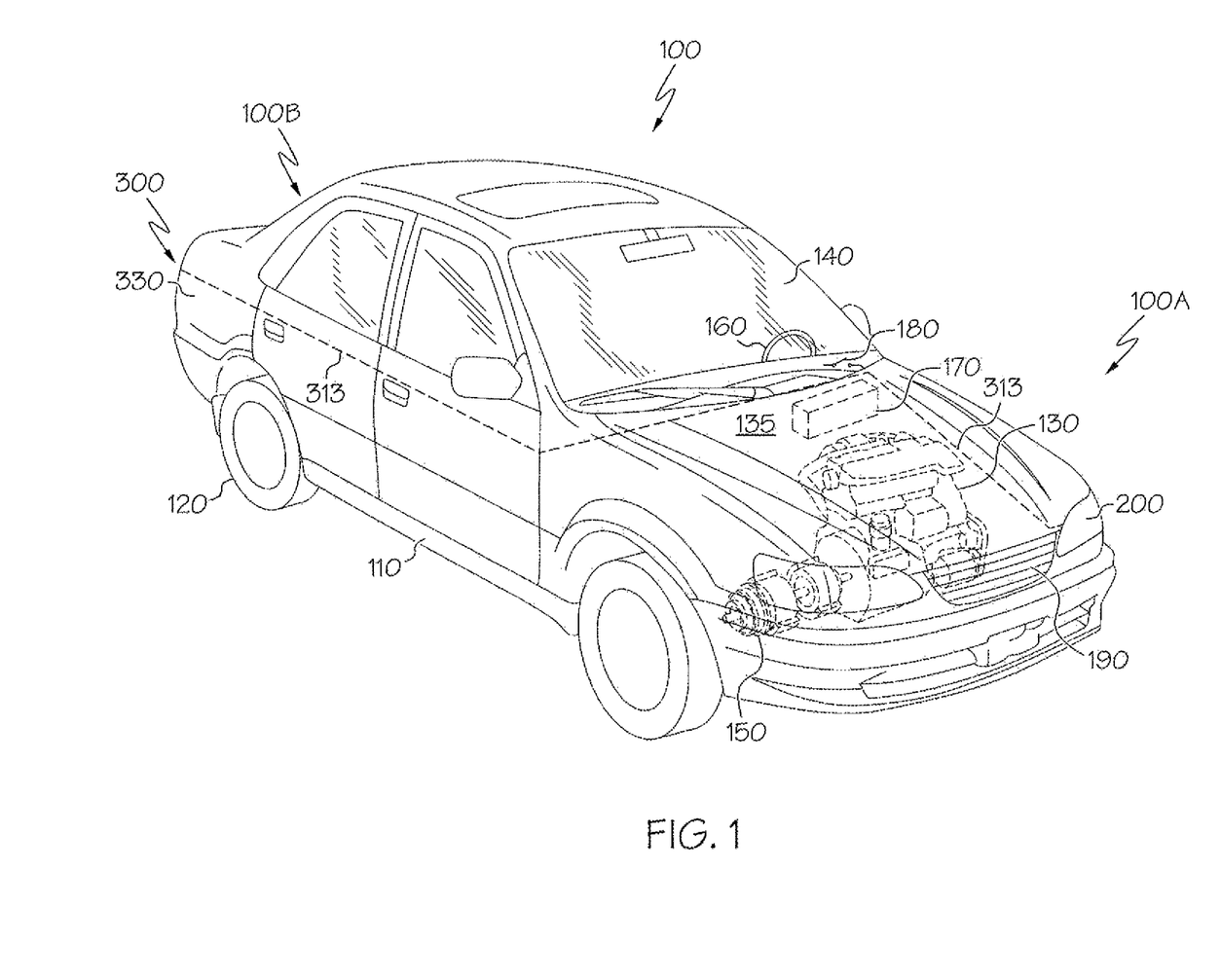
FIG. 1 depicts a forward perspective view of a notional vehicle in accordance with one or more embodiments shown or described herein.

Referring first to FIG. 1, a vehicle 100 includes a forward end 100A (also referred to as the fore compartment) and a rear end 100B (also referred to as the aft compartment). The vehicle 100 includes a chassis 110 with a plurality of wheels 120. Chassis 110 may either be of body-on-frame or unibody construction, and both configurations are deemed to be within the scope of the present disclosure. A motive power unit 130 such as a conventional internal combustion engine (ICE), battery pack, fuel cell stack or a hybrid combination of one or more of the above may be situated in or on the chassis 110 to provide propulsive power to the vehicle 100. As shown, the motive power unit 130 is situated within an engine compartment 135 underneath a hood that is placed at the top of the fore compartment 100A. Within the present context, it will be appreciated that the engine compartment 135 may be formed within other portions of the wheeled chassis 110 besides the fore compartment 100A, including the aft compartment 100B and a middle compartment that may be situated immediately behind a passenger compartment 140; this last configuration is commonly associated with vehicles configured as mid-engine sports cars. The passenger compartment 140 is formed inside the chassis 110 and serves not only as a place to transport passengers and cargo, but also as a place from which a driver may operate vehicle 100. A transmission 150 is coupled to the motive power unit 130 such that together they form a drivetrain through which a torque may be applied to some or all of the wheels 120. A guidance apparatus (which may include, among other things, steering wheel, accelerator, brakes or the like) 160 is used in cooperation with the wheels 120, motive power unit 130, transmission 150 and other systems to control movement of the vehicle 100.

Figure 6:
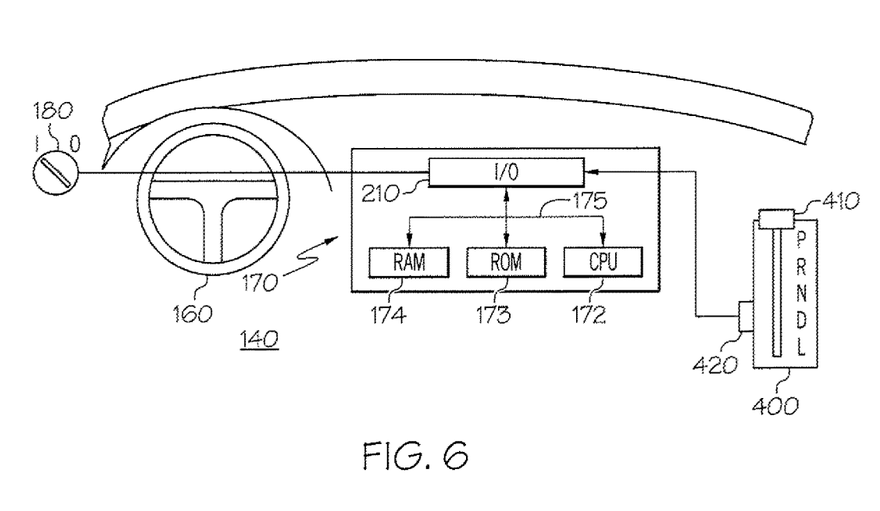
FIG. 6 depicts details of the controller used to provide, among other things, illumination instructions to the vehicular tail lamp assembly of FIGS. 4 and 5.

Referring next to FIG. 6 in conjunction with FIG. 1, control of electrical signals to or from the various electrical-based components and systems of vehicle 100 may be provided by one or more electronic control units (ECUs, also referred to herein as a controller) 170. Although shown notionally as being within the passenger compartment 140 or an engine compartment, it will be appreciated that the ECU 170 is situated in any suitable location within vehicle 100 where access to wiring, harnesses or busses is readily available. In addition, it will be appreciated that ECU 170 may be one of many such control units within the vehicle 100, depending on the desired degree of integration or autonomy among such control units. ECU 170 is provided with one or more input/output (I/O) 171, microprocessor or central processing unit (CPU) 172, read-only memory (ROM) 173 and random-access memory (RAM) 174, all of which are respectively connected by a bus to provide connectivity for a logic circuit 175 for the receipt of signal-based data, as well as the sending of commands or related instructions. Various algorithms and related control logic may be stored in the ROM 173 or RAM 174 in the form of program code that can be manipulated or otherwise operated on by CPU 172 and then conveyed via I/O ports 171 to wiring 313 that delivers electric current to (among other components) the tail lamp assemblies 300 in manners known to those skilled in the art. Thus, in one form, CPU 172 can be made to operate on the control logic such that individually and together the various components making up ECU 170 define the logic circuit 175 needed to provide the various forms of lighting functions as discussed herein. In one form of I/O 171, signals from a switch 180 (such as a combination head lamp and tail lamp switch) are input to ECU 170. Other such signals, such as an ignition signal (not shown) that indicates whether or not the engine or related motive power unit 130 is operational may also be signally provided to ECU 170 for suitable processing by the control logic, as can radio-frequency or related signals sent from a driver's key fob.

Within the passenger compartment 140, numerous dials, switches, buttons and other control elements are placed at the driver's disposal in order to selectively operate various vehicular systems; one such control element is in the form of the switch 180 that may be used by the driver to selectively turn on head lamp assemblies 200 and the tail lamp assemblies 300 that will be discussed in more detail later in conjunction with FIGS. 4 and 5. In one form, switch 180 is mounted to the instrument panel or dashboard. As will be understood, such switch 180 is coupled to a battery, alternator or other power source (not shown) in order to provide the electric current needed to power the tail lamps 300. More particularly, the switch 180 may be structured to provide various forms of illumination by a tail lamp light source 312 and optic element 360 both as will be discussed in more detail later in conjunction with FIGS. 4 and 5; such forms may include providing illumination upon activation of the light source 312, upon activation of a daytime running lamp (not shown), upon activation of a turn signal (not shown), and in situations independent of any other lighting on the vehicle 100. In one form, ECU 170 is operable to receive a command from the driver through the switch 180 to actuate the various lights, including the tail lamp assemblies 300. In addition to the switch 180, the command made given by a remote input, such as by actuation of a remote key. With particular regard to the tail lamp assemblies 300, the ECU 170 may be operable to actuate the light source 312 that is situated within each of the driver-side and passenger-side combination lamp 310 that will be discussed in more detail later in conjunction with FIGS. 4 and 5.

A gear selector 400 (also referred to as a gear shifter or the like) is typically mounted on a center console (not shown) that separates the driver from the other front-seat passenger. In configurations where vehicle 100 is outfitted with an automatic transmission 150 that has a conventional gearing system that includes a park, reverse, neutral and a plurality of forward gears, the gear selector 400 is comparably arranged in the P-R-N-D-L format, where changing gears between these settings may be effected through movement of a gear shift lever 410. A gear status indicator 420 (which may be in the form of a sensor) is used to send a signal to the ECU 170 to provide an indication of the presently-selected gear. In use, the gear selector 400, gear shift lever 410 and status indicator 420 are coupled to the ECU 170 and the head lamp assemblies 200 and tail lamp assemblies 300 in order to correlate a particular illumination pattern based on the gear selected. For example, if the "reverse" gear is selected, the light source 312 of the tail lamp assemblies 300 will generate a backing ore reversing beam pattern that is generally associated with a white light.

Figure 2:
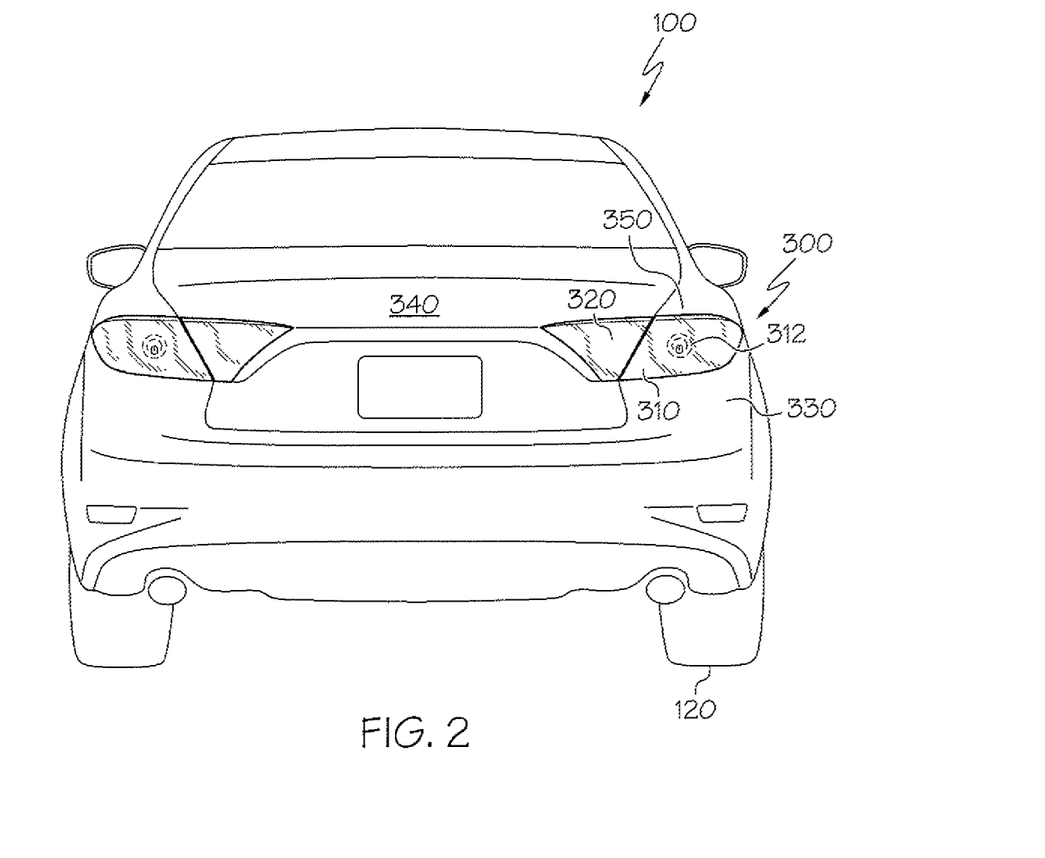
FIG. 2 depicts a rear perspective view of the vehicle of FIG. 1.

Referring next to FIG. 2, a rear perspective view of the vehicle 100 of FIG. 1 is shown to emphasize one exemplary placement of the tail lamp assemblies 300 at the aft compartment 100B. In one form, such tail lamp assemblies 300 are formed as left and right variants that are disposed within respective left and right quarter panels 330 (more generally referred to as body panels) that form a portion of the aft compartment 100B on opposing lateral sides of a pivoting trunk lid 340. Likewise, a gap 350 is formed between the outer surfaces that define the quarter panels 330 and the trunk lid 340; in one form, the width of the gap 350 is determined by manufacturing tolerances and overall fit and finish of vehicle 100. Although vehicle 100 is presently depicted as a sedan, it will be appreciated that other vehicular forms, including sport utility vehicles (SUVs), crossovers, vans (including minivans) and trucks that employ either an articulating rear door or trunk, or merely give the appearance of having such an articulating door or trunk may also be equipped with the tail lamp assembly 300 disclosed herein, and that all such variants are deemed to be within the scope of the present disclosure. As shown, the width of the left and right tail lamp assemblies 300 is such that the portions associated with the lid lamps 320 are formed on the trunk lid 340 on a laterally inward side of the gap 350, while the portions associated with the combination lamps 310 are formed on the quarter panel 330 that is on a laterally outward side of the gap 350. Within the present context, the individual lamps 310, 320 together make up the tail lamp assembly 300; in this way, each lamp 310, 320 can be thought of as having at least semi-autonomous structure in the form of lenses 311, 321, which may also extend to autonomous or semi-autonomous attachment, affixing or mounting structure, depending on the degree of component integration.

Figure 4:
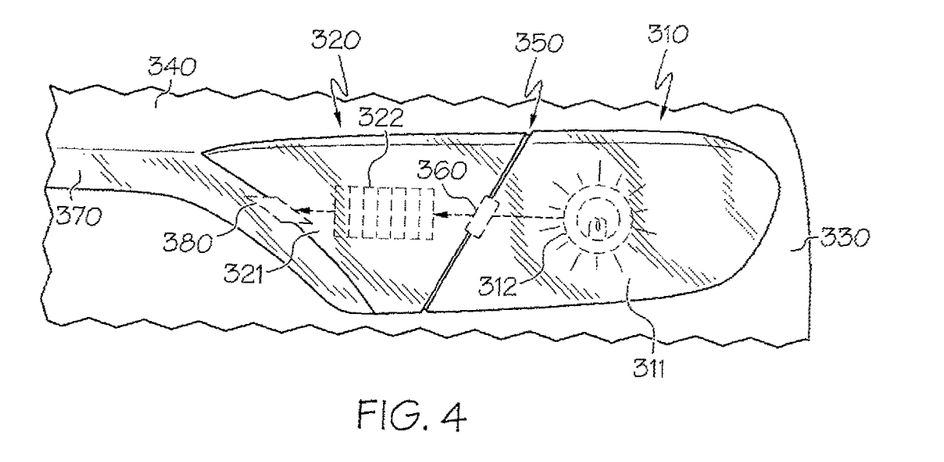
FIG. 4 depicts an elevation view of the vehicular tail lamp assembly in accordance with one or more embodiments shown or described herein.

Referring next to FIG. 4, details of one of the tail lamp assemblies 300 according to the present disclosure is shown. Although shown presently as the passenger-side tail lamp assembly 300, it will be appreciated that the features discussed herein are also applicable to the driver-side tail lamp assembly 300—an example of which is shown in FIG. 2—where the components are essentially mirror-images of the ones shown. In one form, the light source 312, first outer lens 311, optic element 360 and associated electrical wiring 313 may be disposed on or within a housing (shown later in FIG. 5) that can be sized and shaped to fit within a recess, cutout or related volumetric space within the respective quarter panel 330, trunk lid 340 or adjacent body structure of vehicle 100. Within the present context, the use of the term "first" to describe certain components—such as the optic element, outer lens, adjacently-spaced gap or the like—does not necessarily imply that there are additional (for example, second or third) such components, but rather as an identification aide to help distinguish such first components from similar such additional components in configurations where more than one of such component are present. Together, the housing and the first outer lens 311 form an enclosure for the light source 312, optic element 360, electrical wiring 313, as well as for other components needed to provide the rearward illumination function for vehicle 100. In one form, the electrical wiring 313 may be part of a larger wiring harness that supplies electrical current to the left and right side tail lamp assembly 300 light sources 312, while in another as dedicated wiring for such light sources 312. In one form, the main tail lamp light source 312 is formed from a single filament, and may be an incandescent filament including those that are halogen-based; such a configuration may make up a reflector-based tail lamp. In another form, the main tail lamp light source 312 is formed from a filament that is part of an arc-discharge source that may also include projector-based components. In yet another form, the tail lamp light source 312 is formed from one or more light-emitting diodes (LEDs). In still another form, the light source 312 is formed from a laser-based light source. All of these aforementioned forms are deemed to be within the scope of the present disclosure.

In one form, an additional garnish 370 may be included to extend adjacent the lid lamp 320 or combination lamp 310. Such garnish 370 may be formed of optically transparent material in a manner generally similar to that of the first outer lens 311 of the combination lamp 310 and the second outer lens of the lid lamp 320. As shown, the garnish 370 may extend laterally inward toward a longitudinal centerline of vehicle 100, although it will be appreciated that such extension may be provided in other directions as well, including downward, upward or laterally outward toward the quarter panels 330. Regardless of the placement, the tail lamp assembly 300 may be additionally outfitted with a second optic element 380 and reflective element 322 and placed in such a way to receive a portion of the direct beam pattern $B_D$ for supplemental lighting of a region defined by the garnish 370. As with the lid lamp 320, the garnish 370 may be made to direct light emanating from the light source 312 in a generally rearward direction from the aft compartment 100B of vehicle 100.

Figure 5:
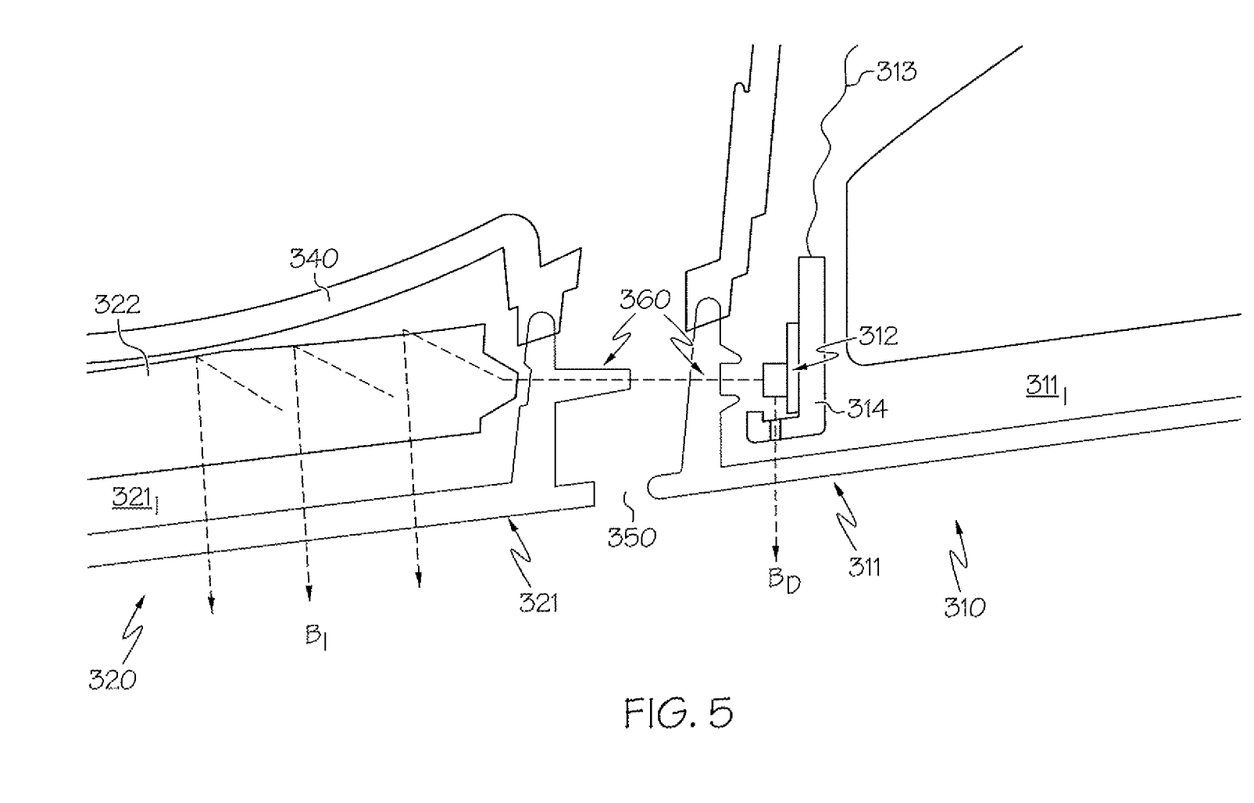
FIG. 5 depicts a simplified plan view of the placement of the vehicular tail lamp assembly of FIG. 4.

Referring next to FIG. 5, the optic element 360 is disposed between the adjacent laterally-facing sides of the first and second outer lenses 311, 321 of the respective combination and lid lamps 310, 320 so that light being emitted from the lamp assembly is directed into the lid lamp through the optic that acts as a light coupling device. As shown, the optic element 360 is made from an optically-transparent or translucent material such as glass, polycarbonate or the like. In addition, it is shaped as a repeating series of elongate prisms in order to direct the reflected indirect beam $B_I$ (as discussed in conjunction with FIG. 5) in a preferred pattern towards and through the outer lens 321 of the lid lamp assembly 320. The prism-like structure and adjacent discontinuities allows the optic element 360 to function as a Fresnel lens or an optical wave guide, the latter particularly if the index of refraction between one or more of the prisms is varied in manners known to those skilled in the art.

The optic element 360 is shown as being integrally formed as part of the adjacently-spaced first and second outer lenses 311, 321. In one such example, such integral forming may be by molding or other known methods suitable to the formation of plastics, polycarbonates or other plastic-based material that is optically transparent in the visible spectrum, as well as scratch-resistant and anti-ultraviolet degradation additives or coatings. In another form, the outer lenses 311, 321 may be made from glass.

In one form, the light source 312 is part of a reflector-based system where one or more angled or parabolic reflectors (not shown) can orient the direct beam $B_D$ along a desired illumination path such as that which extends rearward of the vehicle 100. In such case, the bulb that makes up the light source 312 is filament-based. Likewise, the light source 312 is part of a projector-based system where the light source is based on a filament, arc discharge or the like, and also includes an elliptical reflector and axially-spaced convex (i.e., condenser) lens and a movable shield disposed near a beam focal point that converges axially between the reflector and the lens as a way to provide enhanced beam shaping. Either configuration is designed to gather and shape the light being emitted by the light source 312 in order to project the direct beam $B_D$ behind the vehicle 100 in compliance with increasingly stringent regulatory standards. Both of the reflector-based and projector-based configurations are deemed to be within the scope of the present disclosure.

The cross-sectional view shows the cooperation of the halves of the optic element 360 which direct light rearwardly from the combination lamp assembly 310 through the first outer lens 311, as well in a sideways or laterally inward direction to the lid lamp assembly 320 that is situated on a rearward-facing surface of the trunk lid 340. A gap 350 accounts for the space between the trunk lid 340 and the quarter panel 330. In one optional form, a reflective surface (such as a Fresnel lens or the like) is mounted to the vehicle 100 body to help direct light out of the outer lenses 311, 321. In one embodiment, the optic element 360 is a wave guide. In another embodiment, the optic element 360 is a light flute.

In general, combination lamp 310 may include one or more bulbs that correspond to the light source 312. For example, such bulbs may be included to perform one or more of the following illumination functions: position (that is to say, normal night-time rear illumination), stopping (that is to say, braking), backing (that is to say, reverse) and blinking (such as that used for a turn signal or hazard flashers). It will be understood that in one form, a different bulb may be included within a housing 314 defined between the vehicle quarter panel 330 and the first outer lens 311 for some or all of these illumination functions, while in another form, a single bulb may be used for all such functions. In the latter form, ECU 170 may be used to send an appropriate instruction signal to the light source 312 in order to vary intensity, duration of illumination or other such features that are peculiar to each illumination function. Within the present context, whether the light source 312 includes a single bulb (for example, in the form of a filament) or an array or matrix of blubs (for example, as LEDs) does not detract from it constituting a single source so long as such source 312 is located within a single lamp 310 or 320.

In one form, the surface of the rearward-facing reflective element 322 may be coated with or otherwise formed from material such as metalized plastic or the like that is highly-reflective in the visible (i.e., 400 nanometer to 700 nanometer) spectrum. In addition, such surface may be either faceted, parabolic, elliptical or other suitable shape in order to facilitate the preferred directional projection of an indirect beam pattern $B_I$ that gives the appearance of being generated from within the lid lamp assembly 320. The outer lenses 311, 321 act as a transparent or translucent covering to help not only provide an aerodynamic fairing for the aft compartment 100B, but also to provide environmental protection and isolation to the remainder of the components that make up the tail lamp assembly 300. The outer lenses 311, 321 may be secured within the recesses $311_r$, $321_r$ formed within the various quarter panels 330 or trunk lid 340 through the housing 314 (only a portion of which is shown) that in one form may be made from a molded plastic or other structurally rigid material, and which may include one or more of brackets, tabs, apertures or related connection apparatus to facilitate the joining of the tail lamp assembly 300 to frames or related vehicular support structure (none of which are shown).

The light source 312 is connected via wiring 313 to a suitable source (not shown) of electric current. The size, shape and relative placement of the light source 312 is such that a significant quantity of light generated thereby is directed laterally inward toward the longitudinal centerline of the vehicle 100 and the optic element 360, or rearwardly toward the first outer lens 311 along the direct beam pattern $B_D$. In one form, the light source 312 may emit light in a substantial omnidirectional path in order to ensure a sufficient quantity extends toward both the optic element 360 and the first outer lens 311. The light source 312 may be mounted to a lamp bezel or other similar structure that may make up a portion of the surface that is formed on the housing 314. Additional environmental sealing may also be provided; such sealing may be particularly beneficial in situations where the light source 312 employs one or more LEDs as the means for illumination, as LED-based devices are particularly susceptible to extremes in temperature, moisture and other environmental factors to which vehicle 100 may be exposed.

The first outer lens 311 that covers the light source 312 of the combination lamp 310 may also function as a structural support wall for the light source 312, either with or independent of the housing 314 or corresponding structure from the quarter panels 330, trunk lid 340 or the like. Although not shown, the housing 314 and the adjacent vehicular structure include various support walls that form structure to provide segmentation between the combination lamp 310 and the lid lamp 320. Such segmentation may be made from optically opaque materials—with the notable exception of the optic element 360—in order to keep substantial optical isolation between the rearward-traveling direct beam pattern $B_D$ and the indirect beam pattern $B_I$ that is reflected off of the facets of the reflective element 322.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:
1. A vehicular tail lamp assembly comprising:
a combination lamp comprising a first outer lens and at least one light source disposed on an inward-facing side of the first outer lens, the light source configured to produce a direct beam pattern at least a portion of which extends substantially rearward of a vehicle through the first outer lens;
a lid lamp defining a first adjacently-spaced gap between it and the combination lamp, the lid lamp comprising a second outer lens and a reflective element disposed on an inward-facing side of the second outer lens, and a first optic element signally cooperative with the light source to redirect at least a portion of the direct beam pattern to the reflective element which in turn redirects a reflected portion into an indirect beam pattern through the second outer lens, the first optic element comprising:
    a first portion coupled to the first outer lens; and
    a second portion coupled to the second outer lens, the first portion being signally cooperative with the second portion such that the first portion directs light from the light source across the gap and into the second portion, which redirects the portion of the direct beam pattern to the reflective element, wherein one of the first portion and the second portion extends across the first adjacently spaced gap from a respective side wall of the first outer lens and the second outer lens toward the other of the first portion or the second portion while remaining spaced therefrom.

2. The tail lamp assembly of claim 1, wherein the indirect beam pattern and the direct beam pattern project along a substantially parallel illumination path.

3. The lamp assembly of claim 1, wherein the lid lamp does not comprise a light source.

4. The lamp assembly of claim 1, wherein the reflective element comprises a Fresnel lens.

5. The lamp assembly of claim 1, wherein the first optic element comprises at least one of a wave guide and light pipe.

6. The lamp assembly of claim 5, wherein the first portion of the first optic element is formed as part of the combination lamp.

7. The lamp assembly of claim 5, wherein the second portion of the first optic element is formed as part of the lid lamp.

8. The lamp assembly of claim 5, wherein the first portion of the optical element is integrally formed with first outer lens and the second portion of the optical element is integrally formed with the second outer lens.

9. The lamp assembly of claim 1, wherein the light source is selected from the group consisting of light-emitting diode, high-intensity discharge filament, laser and incandescent bulb.

10. The lamp assembly of claim 9, wherein the direct beam pattern and the indirect beam pattern are selected from the group consisting of a daytime running lamp beam pattern, a turn signal lamp beam pattern, a stop light lamp beam pattern, a flasher beam pattern, a reversing lamp beam pattern and a normal tail light lamp beam pattern.

11. The lamp assembly of claim 1, further comprising a second optic element signally cooperative with the first optic element and configured to convey at least a portion of the direct beam pattern to a garnish portion that is spaced across the lid lamp outer lens through a second adjacently-spaced gap.

12. A motor vehicle comprising:
    a platform comprising a wheeled chassis defining passenger compartment, a fore compartment, an aft compartment, an engine compartment comprising an engine disposed therein, and a guidance apparatus cooperative with the wheeled chassis and the engine in order to provide platform motive control;
    a head lamp assembly disposed in the fore compartment; and
    a tail lamp assembly disposed in the aft compartment, the tail lamp assembly comprising:
        a combination lamp comprising a first outer lens and at least one light source disposed on an inward-facing side of the first outer lens, the light source configured to produce a direct beam pattern at least a portion of which extends substantially rearward of the aft compartment through the first outer lens;
        a lid lamp defining an adjacently-spaced gap between it and the combination lamp, the lid lamp comprising a second outer lens and a reflective element disposed on an inward-facing side of the second outer lens, and
        an optic element signally cooperative with the light source to redirect at least a portion of the direct beam pattern to the reflective element which in turn redirects a reflected portion into an indirect beam pattern through the lid second outer lens, the first optic element comprising:
            a first portion coupled to the first outer lens; and
            a second portion coupled to the second outer lens, the first portion being signally cooperative with the second portion such that the first portion directs light from the light source across the gap and into the second portion, which redirects the portion of the direct beam pattern to the reflective element, wherein one of the first portion and the second portion extends across the first adjacently spaced gap from a respective side wall of the first outer lens and the second outer lens toward the other of the first portion or the second portion while remaining spaced therefrom.

13. The vehicle of claim 12, wherein the lid lamp is disposed on a trunk lid portion of the aft compartment such that the adjacently-spaced gap extends between the trunk lid portion and a laterally outward portion of the aft compartment.

14. The vehicle of claim 12, wherein the tail lamp assembly is disposed within a housing that is formed within the aft compartment.

15. The motor vehicle of claim 14, further comprising garnish with an additional optic element signally cooperative with the light source to convey at least a portion of the direct beam pattern to the reflective element which in turn redirects a reflected portion into an indirect beam pattern through the lid lamp outer lens.

16. A method of providing illumination to an aft compartment of a vehicle, the method comprising:
    configuring a tail lamp assembly to comprise:
        a combination lamp comprising a first outer lens and at least one light source disposed on an inward-facing side of the first outer lens;
        a lid lamp adjacently-spaced relative to the combination lamp such that a gap is formed between them, the lid lamp comprising a second outer lens and a reflective element disposed on an inward-facing side of the second outer lens; and
        an optic element signally cooperative with the light source, the first optic element comprising:
            a first portion coupled to the first outer lens; and
            a second portion coupled to the second outer lens, the first portion being signally cooperative with the second portion such that the first portion directs light from the light source across the gap and into the second portion, wherein one of the first portion and the second portion extends across the first adjacently spaced gap from a respective side wall of the first outer lens and the second outer lens toward the other of the first portion or the second portion while remaining spaced therefrom;

producing with the light source a direct beam pattern at least a portion of which extends substantially rearward of the aft compartment through the outer lens;

redirecting at least a portion of the direct beam pattern to the reflective element with the second portion of the optic element; and redirecting a reflected portion of the conveyed direct beam portion into an indirect beam pattern through the lid lamp outer lens.

17. The method of claim 16, wherein the providing illumination is selected from the group consisting of a providing main tail lamp illumination, daytime running lamp illumination, turn signal illumination, reverse light illumination and a brake light illumination.

18. The method of claim 16, wherein the direct beam pattern is routed substantially entirely through the first outer lens.

19. The method of claim 16, wherein the indirect beam pattern is routed substantially entirely through the second outer lens.

20. The method of claim 16, wherein a substantial entirety of the illumination is provided by the light source.

* * * * *